US009445355B2

(12) United States Patent
Sun

(10) Patent No.: US 9,445,355 B2
(45) Date of Patent: Sep. 13, 2016

(54) MULTI-INTERFACE TERMINAL, AND NEIGHBOR TOPOLOGY DISCOVERY AND COOPERATIVE COMMUNICATION METHOD THEREFORE

(75) Inventor: Aifang Sun, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 443 days.

(21) Appl. No.: 14/117,672

(22) PCT Filed: Sep. 1, 2011

(86) PCT No.: PCT/CN2011/079223
§ 371 (c)(1),
(2), (4) Date: Nov. 14, 2013

(87) PCT Pub. No.: WO2012/155410
PCT Pub. Date: Nov. 22, 2012

(65) Prior Publication Data
US 2014/0078935 A1  Mar. 20, 2014

(30) Foreign Application Priority Data

May 18, 2011 (CN) .......................... 2011 1 0129640

(51) Int. Cl.
*H04W 48/16* (2009.01)
*H04W 8/00* (2009.01)
(Continued)

(52) U.S. Cl.
CPC ............. *H04W 48/16* (2013.01); *H04L 45/02* (2013.01); *H04W 8/005* (2013.01); *H04W 40/246* (2013.01)

(58) Field of Classification Search
CPC .. H04L 45/02; H04W 40/246; H04W 48/16; H04W 8/005
See application file for complete search history.

(56) References Cited

U.S. PATENT DOCUMENTS

2004/0103179 A1* 5/2004 Damm ................ H04L 12/1886
709/223
2004/0153676 A1* 8/2004 Krantz .................. G06F 1/3203
713/300

(Continued)

FOREIGN PATENT DOCUMENTS

CN          1622548 A      6/2005
CN          1852261 A      10/2006
(Continued)

OTHER PUBLICATIONS

International Search Report for PCT/CN2011/079223 dated Feb. 1, 2012.

*Primary Examiner* — Dung B Huynh
(74) *Attorney, Agent, or Firm* — Ling Wu; Stephen Yang; Ling and Yang Intellectual Property

(57) ABSTRACT

The present document provides a neighbor topology discovery method for a multi-interface terminal, to improve the usage rate of multiple interfaces. The method includes the following steps: after joining a network, the multi-interface terminal broadcasts a neighbor discovery request message to respective networks via each interface, and the neighbor discovery request message carries a neighbor hop value; and the multi-interface terminal in the network monitors broadcast messages of other terminals in the network where each interface is located; when detecting the neighbor discovery request message, if the neighbor hop value carried in the detected neighbor discovery request message indicates that the present terminal is the last hop, related information in the neighbor discovery request message is extracted, and neighbor information and network topology information of the present terminal is updated; and if not, the neighbor hop value is modified and the neighbor discovery request message is forwarded via all interfaces.

11 Claims, 3 Drawing Sheets

(51) Int. Cl.
*H04L 12/751* (2013.01)
*H04W 40/24* (2009.01)

(56) References Cited

U.S. PATENT DOCUMENTS

| | | | |
|---|---|---|---|
| 2004/0162022 A1* | 8/2004 | Lahetkangas | H04L 45/20 455/41.1 |
| 2004/0170134 A1* | 9/2004 | Furuyama | H04W 52/283 370/310 |
| 2005/0190778 A1 | 9/2005 | Ozluturk | |
| 2007/0167187 A1 | 7/2007 | Rezvani et al. | |
| 2008/0013502 A1* | 1/2008 | Clark | G08C 17/00 370/338 |
| 2008/0317047 A1* | 12/2008 | Zeng | H04L 45/00 370/401 |
| 2009/0201169 A1* | 8/2009 | d'Hont | G01S 13/003 340/8.1 |
| 2012/0076143 A1* | 3/2012 | Liu | H04L 1/08 370/390 |

FOREIGN PATENT DOCUMENTS

| | | | | |
|---|---|---|---|---|
| CN | 101741824 A | 6/2010 | | |
| CN | WO 2010111837 A1 * | 10/2010 | | H04L 1/08 |
| JP | 2001256583 A | 9/2001 | | |
| JP | 2009518968 A | 5/2009 | | |
| JP | 2010199742 A | 9/2010 | | |
| JP | 2012503432 A | 2/2012 | | |
| WO | 2010033438 A1 | 3/2010 | | |

* cited by examiner

MULTI-INTERFACE TERMINAL, AND NEIGHBOR TOPOLOGY DISCOVERY AND COOPERATIVE COMMUNICATION METHOD THEREFORE

TECHNICAL FIELD

The present document relates to the field of the wireless communication technology, and in particular, to a multi-interface terminal neighbor topology discovery and cooperative communication method and a multi-interface terminal.

BACKGROUND OF THE RELATED ART

Multiple communication technologies coexist in the environment of ubiquitous network/internet of things, and the intelligent terminal with multiple modes, multiple interfaces and multiple channels has inevitably become an important development direction. More and more intelligent devices emerge around the users, and are embedded into the space of people's life and work; in order to satisfy people's requirement for network diversification, a lot of terminals carry many interfaces, such as, Bluetooth, infrared, Wireless Local Area Network (WLAN), Worldwide Interoperability for Microwave Access (WIMAX), etc., to become multi-interface intelligent terminals. However, in actual applications, the advantage of the multi-interface intelligent terminal is not fully reflected. Usually the communication link with the optimal link quality is selected to perform the information interaction; the usage rate of many interfaces is very low, and the cooperative communication advantage brought by multiple interfaces is not embodied; in addition, the terminals with different interfaces cannot communicate with each other directly.

SUMMARY OF THE INVENTION

According to one aspect of the present document, a neighbor topology discovery method for a multi-interface terminal, a cooperative communication method and a multi-interface terminal are provided, to improve the utilization rate of the multiple interfaces.

The present document provides a neighbor topology discovery method for a multi-interface terminal, comprising:

after joining a network, the multi-interface terminal broadcasting a neighbor discovery request message to respective networks via each interface, and the neighbor discovery request message carrying a neighbor hop value; and the multi-interface terminal in the network monitoring broadcast messages of other terminals in the network where each interface thereof is located;

when detecting the neighbor discovery request message, if the neighbor hop value carried in the detected neighbor discovery request message indicates that the present terminal is the last hop, then extracting related information in the neighbor discovery request message, and updating neighbor information and network topology information of the present terminal; and if not, then modifying the neighbor hop value and then forwarding the neighbor discovery request message via all the interfaces, extracting the related information in the neighbor discovery request message, and updating the neighbor information and the network topology information of the present terminal.

Preferably, the above-mentioned method can also have the following characteristics, the step of the multi-interface terminal broadcasting a neighbor discovery request message to respective networks via each interface comprises: the multi-interface terminal broadcasting the neighbor discovery request message to respective networks via each interface periodically;

the step of the multi-interface terminal in the network monitoring broadcast messages of other terminals in the network where each interface thereof is located comprises: the multi-interface terminal in the network monitoring the broadcast messages of other terminals in the network where each interface is located periodically; and wherein, a time period for periodically monitoring the broadcast message is less than a time period for periodically broadcasting the neighbor discovery request message.

Preferably, the above-mentioned method can also have the following characteristics, the multi-interface terminal in the network performs a statistics to the broadcast message received by each interface; if no broadcast message of other terminal is received in the network where an interface is located within a set time period, then the multi-interface terminal closes the interface or makes the interface in a dormant state, and periodically wakes up that interface.

The present document further provides a cooperative communication method for a multi-interface terminal, after the multi-interface terminal obtaining network topology information, the method preferably comprises:

when the multi-interface terminal needs to request for a service, obtaining an effective communication link to a target end according to the network topology information;

when the effective communication link is more than one, determining a service distributary mode between various effective communication links; and the multi-interface terminal requesting for the service and parallel transmitting the service through each interface corresponding to each effective communication link according to the service distributary mode.

Preferably, the above-mentioned method can also have the following characteristics, the step of determining a service distributary mode between various effective communication links comprises:

performing an assessment according to one of link information of each effective communication link, service information of the requested service, and interface information of each interface corresponding to each communication link or a combination thereof, and determining the service distributary mode according to an assessment result.

Preferably, the above-mentioned method can also have the following characteristics, the effective communication link is obtained in the following way when the multi-interface terminal in the network needs to request for the service and the effective communication link to the target end is not obtained according to the network topology information:

the multi-interface terminal broadcasting a link relay request message carrying the target end to respective networks via each interface respectively;

when a neighboring terminal receives the link relay request message, judging whether the target end in the link relay request message is itself; if not, forwarding the link relay request message through all of its interfaces; and if yes, returning a link relay response message via an original route to the multi-interface terminal which sends the link relay request message; and after the multi-interface terminal which sends the link relay request message receives the link relay response message, establishing an effective communication link with the target end.

The present document further provides a multi-interface terminal, comprising a network layer and at least two different interfaces, and preferably comprising a multi-interface adaptation layer, wherein, the multi-interface adaptation layer comprises a network topology module and an interface management module, wherein, the network topology module is configured to: after the multi-interface terminal joins a network, send a neighbor discovery request message to each interface, wherein, the neighbor discovery request message carries a neighbor hop value; and after receiving the neighbor discovery request message forwarded by the interface, extract related information in the neighbor discovery request message and update neighbor information and network topology information;

the interface management module is configured to: control and manage the interfaces; and the interface is configured to: broadcast the neighbor discovery request message to a network where the interface is located after receiving the neighbor discovery request message, and monitor broadcast messages of other terminals in the network where the interface is located; when detecting the neighbor discovery request message, if the neighbor hop value carried in the neighbor discovery request message indicates that the present terminal is the last hop, then send the neighbor discovery request message to the network topology module; and if not, send the neighbor discovery request message to the network topology module, modify the neighbor hop value and then forward the neighbor discovery request message via all the interfaces.

Preferably, the above-mentioned multi-interface terminal can also have the following characteristics, the network topology module is configured to: send a neighbor discovery request command to each interface of the present terminal periodically;

the interface is configured to: periodically monitor broadcast messages of other terminals in the network where each interface is located; and wherein, a time period for periodically monitoring the broadcast message is less than a time period for periodically issuing the neighbor discovery request message.

Preferably, the above-mentioned multi-interface terminal can also have the following characteristics, the interface management module is preferably configured to: perform a statistics to the broadcast message received by each interface; if no broadcast message of other terminal is received in the network where an interface is located within a set time period, then close the interface or make the interface in a dormant state, and periodically wake up the interface.

Preferably, the above-mentioned multi-interface terminal can also have the following characteristics, the multi-interface adaptation layer preferably comprises a cooperative control module;

the cooperative control module is configured to: upon receiving a service request command of the network layer, obtain an effective communication link to a target end according to the network topology information maintained by the network topology module; when the effective communication link is more than one, determine a service distributary mode between various effective communication links, and send to the interface management module; and the interface management module is preferably configured to: control each interface corresponding to each effective communication link to request for the service and parallel transmit the service according to the service distributary mode.

Preferably, the above-mentioned multi-interface terminal can also have the following characteristics, the cooperative control module is configured to: perform an assessment according to one of link information of each effective communication link, service information of the requested service, and interface information of each interface corresponding to each communication link or a combination thereof, and determine the service distributary mode according to an assessment result.

Preferably, the above-mentioned multi-interface terminal can also have the following characteristics, the network topology module is preferably configured to: send a link relay request command carrying the target end to each interface when the service request command of the network layer is received and the effective communication link to the target end is not obtained according to the network topology information;

the interface is preferably configured to: broadcast the link relay request message carrying the target end to respective networks respectively after receiving the link relay request command; and forward to the cooperative control module after receiving a link relay response message returned by the target end; and the cooperative control module is preferably configured to: establish an effective communication link with the target end after receiving the link relay response message forwarded by the interface.

Preferably, the above-mentioned multi-interface terminal can also have the following characteristics, the interface is preferably configured to: upon receiving a link relay request message sent by other terminals, judge whether a target terminal in the link relay request message is itself; if not, forward the link relay request message to the interface management module; and if yes, send the link relay request message to the network topology module;

the interface management module is preferably configured to: instruct all interfaces of the multi-interface terminal to forward the link relay request message upon receiving the link relay request message forwarded by the interface; and the network topology module is preferably configured to: update the network topology information upon receiving the link relay request message, and instruct each interface to return the link relay response message to a source multi-interface terminal initiating the link relay request via an original route.

The above-mentioned multi-interface terminal shields the heterogeneity of the network and the difference of the interfaces from the users in the communication process; because of taking full of its multi-interface advantage, the multi-interface parallel transmission can increase the communication efficiency effectively through the cooperative communication, and expands the reachability of the terminal and the coverage range of the network effectively by utilizing different interfaces to form the multi-hop relay transmission.

PREFERRED EMBODIMENTS OF THE PRESENT INVENTION

Figure 1:
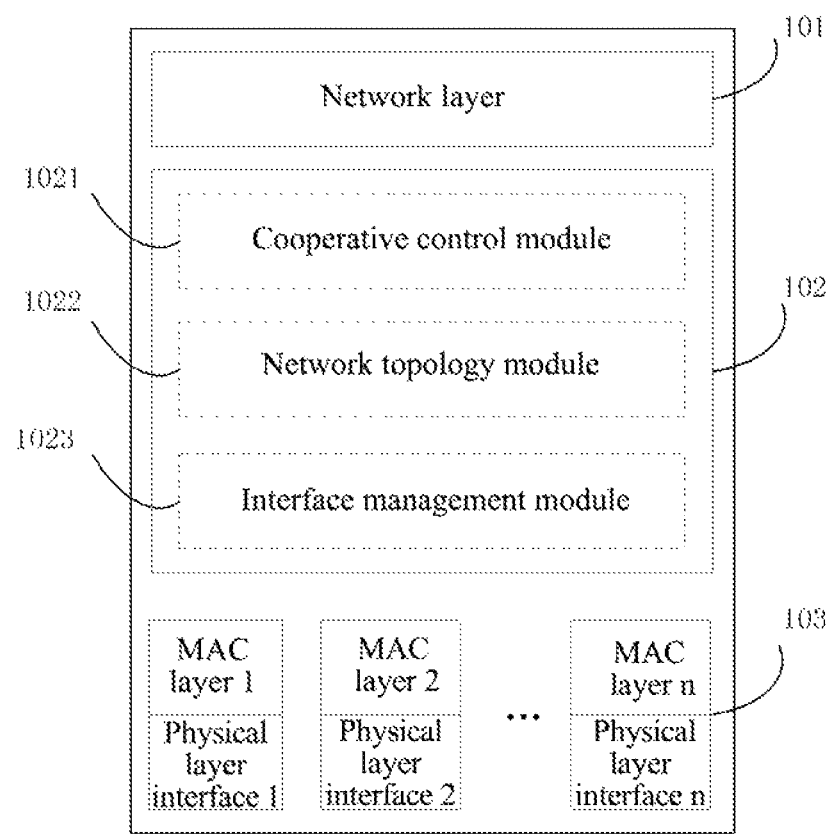
FIG. 1 is a structure diagram of a multi-interface terminal provided by an embodiment of the present document.

In order to make the objective, technical scheme and advantage of the present document much clearer and more obvious, the embodiments of the present invention will be described in detail with reference to the accompanying drawings hereinafter. It should be understood that the embodiments described here are only used for explaining the present invention and not intended to limit the present invention. It should be illustrated that, in the case of not conflicting, the embodiments in the present application and features in these embodiments can be combined with each other.

This embodiment provides a multi-interface terminal, wherein, the multi-interface terminal includes but is not limited to the communication terminal including the mobile terminal, has at least two interfaces, and can access different wireless networks through many kinds of wireless interface modes, such as, WLAN, Internet, WIMAX, ZigBee, etc. The multi-interface terminal described in the present embodiment is different from the traditional wireless router and some current multi-interface implementation modes, and a plurality of interfaces carried thereon can access the heterogeneous networks in many kinds of modes, thereby realizing the interconnection between the heterogeneous terminal.

The multi-interface terminal can shield the diversification and dissimilarity of interface for the upper layer network by adding a multi-interface adaptation layer between the MAC layer and the IP (network) layer, and provide various application services of the higher layer for the interface.

The present embodiment provides a method for discovering the circumference terminal by utilizing the above-mentioned multi-interface terminal, that is, the neighbor terminal topology discovery method, including the following steps:

the multi-interface terminal sends the neighbor discovery request message to each interface through the multi-interface adaptation layer periodically after joining the network, and the interface (the MAC layer and the physical layer) corresponding to each interface mode encapsulates the message after receiving it, and transmits the message to the wireless channel of the network where each interface is respectively located through the air interface by way of the broadcast message (the broadcast message includes a neighbor hop value, and the size of the neighbor hop value is decided by the size of the network requiring the topology);

the multi-interface also monitors the broadcast messages of other terminals in the channel through each interface of itself. If any interface receives the neighbor discovery request message, then the neighbor hop value in the neighbor discovery request message is extracted; if the neighbor hop value indicates that the current terminal is the last hop, then the neighbor discovery request message is sent to the multi-interface adaptation layer; if not, the neighbor discovery request message is sent to the multi-interface adaptation layer, the neighbor hop value is modified, and then the neighbor discovery request message is transmitted through all interfaces. Specifically, if the hop number value is greater than 1, then the hop number value is subtracted by 1 and uploaded to the network topology module of the multi-interface adaptation layer, and the message is transmitted through each interface; if the hop number value is not greater than 1, then the neighbor discovery request message is uploaded to the network topology module directly;

the network topology module of the multi-interface adaptation layer receives the neighbor discovery request message, extracts the useful information in the message, and updates and maintains the neighbor information and the network topology information;

especially, if a certain interface mode of the multi-interface terminal fails to receive any broadcast message of other terminals within a set time period, then the interface mode is thought to be invalid; and in order to reduce the power consumption, the interface is closed or enters the dormant state, and is waken up at regular intervals to receive the message;

through the above-mentioned steps, all terminals can reach the neighbor heterogeneous terminal through one hop or multi-hop link, which substantially realizes the interconnection and interworking between the heterogeneous terminals.

The present embodiment further provides a highly efficient communication method completed by a user terminal in cooperation with the neighbor terminals initiated for finishing a certain communication service, and the service providing side may be a certain terminal or may come from a network facilitator; and the specific method includes the following steps:

the service request command of the user terminal is sent to the multi-interface adaptation layer, and the cooperative control module calls the network topology information of the network topology module and searches for the effective communication link to the target end; wherein, the target end provides the terminal or network for the service;

when the quantity of the effective communication link is one, the link is established directly, and the request and transmission of the service is performed;

when the effective communication link is more than one, the cooperative control module performs an assessment according to one of link information of each effective communication link, service information of the requested service, and interface information of each interface corresponding to each communication link or a combination thereof, and determines the service distributary mode according to an assessment result, and requests for the service and parallel transmits the service through each interface corresponding to each effective communication link according to the service distributary mode. The multiple communication links described here are related to the quantity of the interfaces with which the multi-interface terminal can communicate, and each communication link corresponds to one interface. Wherein, the link information of each effective communication link includes: the time delay of the network, the link bandwidth, the congestion situation, the link energy consumption, etc.; the interface information includes, the interface priority, etc.; and the service information includes the service type, etc.

FIG. 1 shows a structure diagram of a multi-interface terminal which can realize the interconnection and interworking between the heterogeneous terminals provided by the embodiment of the present invention. The multi-interface terminal includes a network layer 101, a multi-interface adaptation layer 102 and each interface 103, wherein, the interface 103 includes a MAC layer and a physical layer, wherein, the network layer 101 and the interface 103 are the same as a common terminal; because each interface is corresponding to different network modes, the network protocol of the lower layer also differs from one another; in order to complete the interconnection and interworking function between the heterogeneous terminals, the multi-interface adaptation layer 102 is added between the network layer 101 and the interface 103, to implement the functions, such as the resource management and scheduling, the protocol address conversion, etc.

The multi-interface adaptation layer 102 includes a cooperative control module 1021, a network topology module 1022 and an interface management module 1023, wherein:

the cooperative control module 1021 is the key for the multi-interface terminal realizing the cooperative communication and the distributed cooperative relay communication, can analyze the communication link stored by the network topology module through analyzing the time delay of the network, the transmission link bandwidth, the congestion situation, the link energy consumption, the interface priority, the service type, etc., to make a rational and highly efficient cooperative communication mode and select the interface, and send the control command and information to the interface management module 1023 to perform the transmission;

the network topology module 1022 is mainly used to implement storing and updating the neighbor information and the network topology information during the neighbor discovery process, store the interface information, the address, the location information, etc., of the surrounding neighbor terminals, and establish the communication link with the target end through the logic topology of the network and the physical topology relationship;

the interface management module 1023 is configured to control and manage the multiple interfaces of the terminal, close the interface with a low utilization frequency to save the power, and realize the maximum utilization of the power by the dormancy waking up mechanism on the premise of not influencing the normal communication of the network; and in addition, the interface management module also stores the Address Resolution Protocol (ARP) table for storing the MAC address of the terminal under different interface modes, and converting the address, to make it present the uniform IP address to the users.

Figure 2:
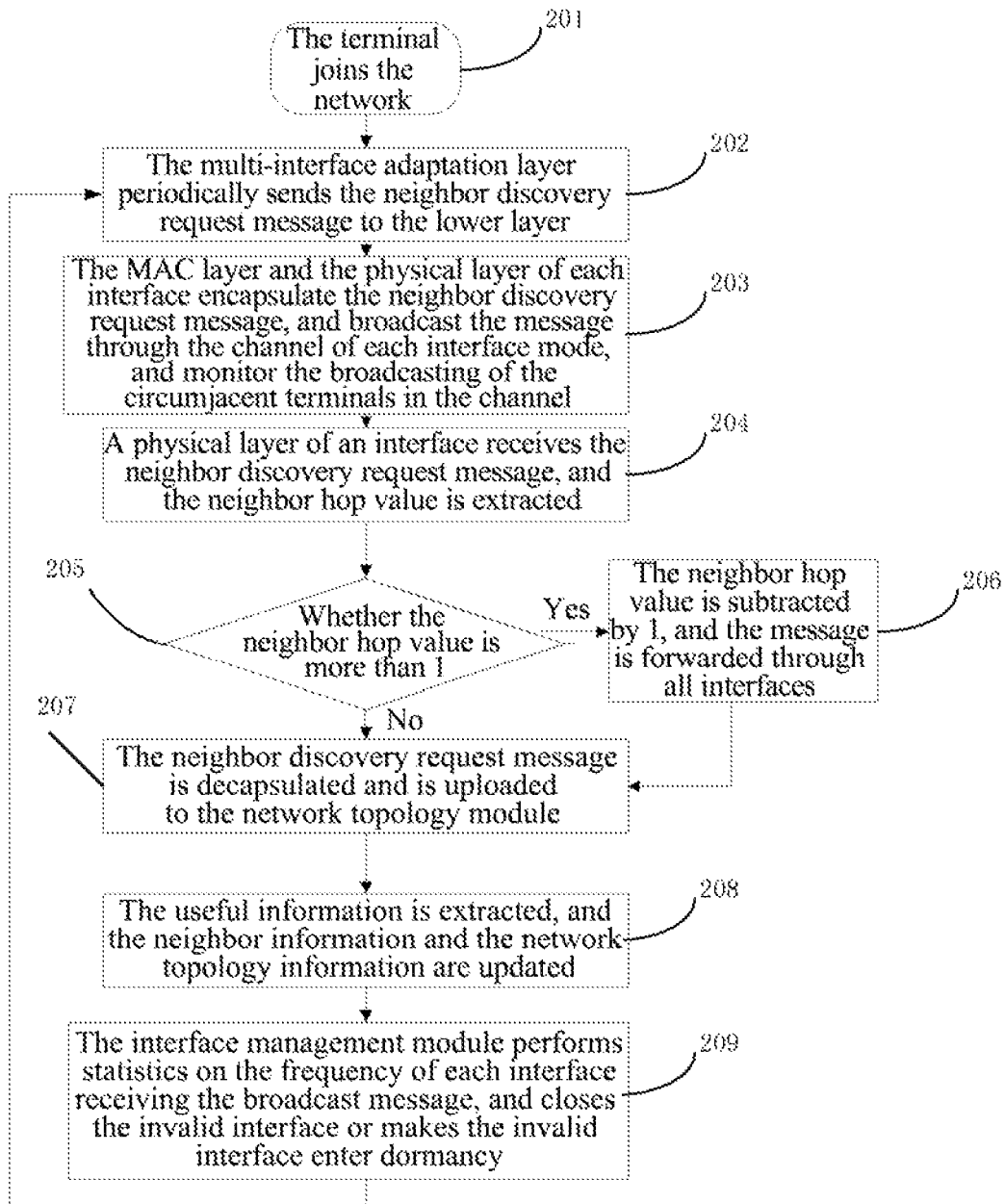
FIG. 2 is a flow chart of a neighbor terminal topology discovery method according to an embodiment of the present document.

As shown in FIG. 2, the embodiment of the present invention provides a neighbor terminal topology discovery method, and the method includes the following steps:

in step 201, the multi-interface terminal joins the network, because of the existence of the multi-interface mode, here the terminal might send out a joining request to a plurality of networks in the area and finish the joining process, and now the multi-interface terminal does not store the neighbor node information;

in step 202: the multi-interface adaptation layer of the multi-interface terminal periodically sends the neighbor discovery request message to the interface after joining the network successfully, and the neighbor discovery request message carries the neighbor hop value;

in the present step, the reason why the neighbor discovery request message is periodically sent is considering that the terminal itself may be in a movement state, and the state of its circumjacent network and node is changing all the time; even if the terminal mobility is very low, the circumjacent node joins and exits the network aperiodically as well, and the relationship of the network topology location is in a changing process, and the period of the neighbor discovery request message can be adjusted appropriately according to the network change; in addition, in the present step, the neighbor hop value is the network range that the neighbor discovery request message can cover, one hop only covers the terminals which have the communication link with that terminal directly, while the a multi-hop experiences the relay transmission of a plurality of relay terminals, and the coverage range is wider; generally the small LAN only needs three to four hops to be able to finish the connection of the nodes of the whole network;

in step 203: each interface encapsulates the neighbor discovery request message received from the multi-interface adaptation layer, and transmits it through the wireless channels of all interfaces to the network where each interface mode is located by way of broadcasting, and sets the timer to regularly monitor the broadcast messages of other circumjacent terminals in each interface signal channel at the same time;

in the present step, the neighbor discovery request message can only be transmitted in the respective network if encapsulated according to the requirement of the transmission protocol of the network where each interface is located; and in addition, the regular time period set for monitoring the signal channel should be less than the time period for periodically broadcasting, so as to reduce loss of the broadcast message as much as possible;

in step 204: once an interface detects the neighbor discovery request message, the message is unpacked and the neighbor hop value therein is extracted;

in step 205: the neighbor hop value is judged; if the neighbor hop value is 1 (indicating that the current terminal is the last hop), then the message is transmitted directly, and skip to step 207; otherwise, skip to step 206;

in step 206: since the hop number value is not 1, it also needs to continue to transmit the neighbor discovery request message to the distal end, the neighbor hop value is subtracted by 1, the neighbor discovery request message is backed up, and the neighbor discovery request message is encapsulated, and the neighbor discovery request message is forwarded to the network where the interface is located through all interfaces;

in step 207: the interface transmits the neighbor discovery request message to the upper layer, to the network topology module of the multi-interface adaptation layer;

in step 208: the network topology module extracts the useful information in the neighbor discovery request message, and updates the stored neighbor information and network topology information;

in the present step, the useful information includes the interface information, the address, the location information of the neighbor node, etc., and the network topology information is the topology of the whole network optimally configured and obtained by the network topology module according to the circumjacent node information, including the optimum route of the terminal reaching at any terminal of the network;

in step 209: the interface management module of the multi-interface adaptation layer performs a statistics to the frequency of each interface receiving the broadcast message; if a certain interface is found to not receive the broadcast message of other terminal for some time, that is, there is no neighbor terminal under the network mode where it is located, then the interface is closed or enters the dormancy in order to save the power consumption; so far a period of the neighbor discovery is over.

The real time network topology structure, the multi-hop link of the terminal reaching any terminal of the network and the optimum route can be established through the above-mentioned methods.

Figure 3:
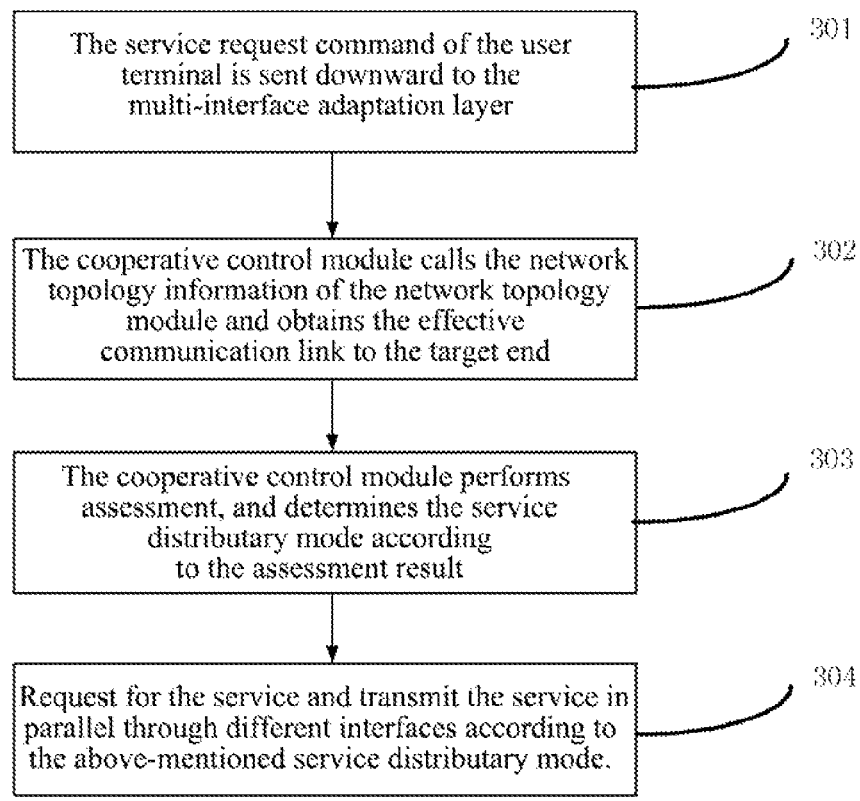
FIG. 3 is a flow chart of cooperative communication of a multi-interface terminal according to an embodiment of the present document.

The flow chart shown in FIG. 3 describes the processing procedure of the cooperative communication and parallel transmission of the multi-interface terminal, and the specific steps are as follows:

in step 301: when a multi-interface terminal needs to to request for the service from a certain terminal or network, the service request command is sent to the multi-interface adaptation layer downward;

in step 302: the cooperative control module of the multi-interface adaptation layer extracts the service request command and obtains the target end (target network or target terminal), calls the network topology information maintained by the network topology module and obtains the effective communication link from the user terminal to the target end;

in step 303: the cooperative control module performs an assessment to the link quality, the communication rate, the bandwidth, the service type, the interface priority etc., of each communication link, makes the service distributary mode according to the assessment result, and sends it to the interface management module;

in step 304: the interface management module controls the interface corresponding to each effective communication link to request for the service and parallel transmits the service according to the service distributary mode.

Figure 4:
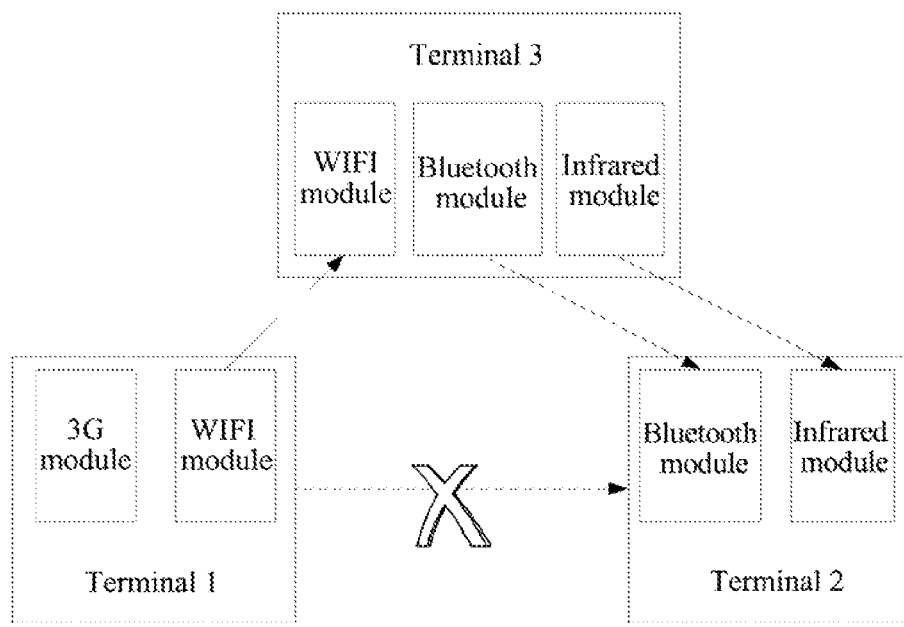
FIG. 4 is a structure diagram of establishing a multi-top connection between heterogeneous terminals through a multi-interface terminal according to an embodiment of the present invention.

The information interaction between the heterogeneous terminals can be realized by forming the relay transmission with the help of the circumjacent multi-interface terminals and by utilizing the characteristic of the multi-interface terminal. FIG. 4 shows a structure diagram of establishing a multi-top connection between heterogeneous terminals through a multi-interface terminal according to the embodiment of the present invention.

As shown in FIG. 4, the terminal 1, the terminal 2 and the terminal 3 are all the multi-interface terminals described in the present embodiment, wherein, the terminal 1 has a 3G module and a WIFI module, and the terminal 2 has a Bluetooth module and an infrared module; since the two have no interface for accessing the same network, they cannot communicate with each other directly. However, a communication link can be established with the help of the circumjacent terminals by way of establishing a multiple-hop connection through the cooperative communication method put forward by the present embodiment, and the specific implementation mode is as follows:

in step 401, the multi-interface adaptation layer of the terminal 1 updates the network topology information of the network topology module through the discovery of the neighbor terminal, and broadcasts the link relay request message carrying the target end (which is the terminal 2 in the present embodiment) to the respective network through the 3G module and the WIFI module interface;

in step 402, an interface of the circumjacent terminal (the communication process is explained by the terminal 3 in the present embodiment, while in the actual communication procedure, there may be more than one terminals implementing the relay transmission) receives the link relay request message (the WIFI module interface of the terminal 3), then the circumjacent terminal judges whether the target end in the link relay request message is itself; if not, the terminal encapsulates the link relay request message, and continues to transmit the link relay request message through all of its interfaces (three interfaces, WIFI, bluetooth, infrared); specifically, the link relay request message is sent to the interface management module, and the interface management module controls all interfaces to forward the link relay request message;

in step 403, the Bluetooth interface and the infrared interface of the terminal 2 receive the link relay request message forwarded by the terminal 3, de-encapsulates the message and finds that the target end is itself, and uploads the link relay request message to the network topology module of the multi-interface adaptation layer of the terminal 2; and the network topology module updates the network topology information, and returns the link relay response message back through two interfaces via the original route at the same time;

the link relay response message carries the target end information, including the interface information, how many hops, the bandwidth of the communication link, the congestion situation, etc.

The interface of the terminal 1 receives and the link relay response message from the terminal 2, and reports it to the cooperative control module of the multi-interface adaptation layer of the terminal 1; the cooperative control module of the terminal 1 establishes connection with the terminal 2 through two routes respectively to perform the service interaction according to the service demand, the bandwidth of the communication link, etc. Specifically, the cooperative control module of the terminal 1 makes the service distribution decision and issues sends to the interface management module, and the interface management module controls the corresponding interface to establish the connection to transmit the service according to the service distribution decision.

The present embodiment provides a multi-interface terminal includes a network layer and at least two different interfaces, and preferably includes a multi-interface adaptation layer, wherein, the multi-interface adaptation layer includes a network topology module and an interface management module, wherein, the network topology module is configured to: after the multi-interface terminal joins in a network, send a neighbor discovery request message to each interface, wherein, the neighbor discovery request message carries a neighbor hop value; and extract related information in a neighbor discovery request message and update neighbor information and network topology information after receiving the neighbor discovery request message forwarded by the interface;

the interface management module is configured to: control and manage the interface; and the interface is configured to:

broadcast the neighbor discovery request message to a network where it is located after receiving the neighbor discovery request message, and monitor broadcast messages of other terminals in the network where the interface is located; when detecting the neighbor discovery request message, if the neighbor hop value carried in the neighbor discovery request message indicates that a present terminal is the last hop, then send the neighbor discovery request message to the network topology module; and if not, send the neighbor discovery request message to the network topology module, modify the neighbor hop value and then forward the neighbor discovery request message via all the interfaces.

Preferably, the network topology module is configured to: send a neighbor discovery request command to each interface periodically;

the interface is configured to: monitor broadcast messages of other terminals in the network where each interface is located periodically;

wherein, a time period for periodically monitoring the broadcast message is less than a time period for periodically broadcasting the neighbor discovery request message.

Wherein, the interface management module is preferably configured to: perform a statistics to the broadcast message received by each interface; if no broadcast message of other terminal is received in the network where an interface is located within a set time period, then close the interface or make the interface enter a dormant state, and periodically wake that interface up.

Wherein, the multi-interface adaptation layer preferably includes a cooperative control module; the cooperative control module is configured to: when receiving a service request command of the network layer, obtain an effective communication link to a target end according to the network topology information maintained by the network topology module; when the effective communication link is more than one, determine the service distributary mode between various effective communication links, and send to the interface management module; and the interface management module is preferably configured to: control each interface corresponding to each effective communication link to request for the service and parallel transmit the service according to the service distributary mode.

Wherein, the cooperative control module is configured to: perform an assessment according to one of link information of each effective communication link, service information of the requested service, and interface information of each interface corresponding to each communication link or a combination thereof, and determine the service distributary mode according to an assessment result.

Wherein, the network topology module is preferably configured to: send a link relay request command carrying the target end to each interface when the service request command of the network layer is received and the effective communication link to the target end is not obtained according to the network topology information;

the interface is preferably configured to: broadcast the link relay request message carrying the target end to respective network respectively after receiving the link relay request command; and forward the link relay response message to the cooperative control module after receiving the link relay response message returned by the target end; and the cooperative control module is preferably configured to: establish an effective communication link with the target end after receiving the link relay response message forwarded by the interface.

Wherein, the interface is preferably configured to: judge whether a target terminal in the link relay request message is the multi-interface terminal itself when receiving the link relay request message sent by other terminals; if not, forward the link relay request message to the interface management module; and if yes, transmit the link relay request message to the network topology module;

the interface management module is preferably configured to: instruct all interfaces of the multi-interface terminal to forward the link relay request message upon receiving the link relay request message forwarded by the interface; and the network topology module is preferably configured to: update the network topology information upon receiving the link relay request message, and instruct each interface to return the link relay response message to a source multi-interface terminal initiating the link relay request via an original route.

It can be seen from the above-mentioned embodiments that, because of taking full advantage of its multiple interfaces, the multi-interface terminal of the present embodiment increases the communication efficiency effectively through the cooperative communication with the circumjacent terminals and through the multi-interface parallel transmission, and expands the terminal reachability and the coverage range of the network effectively by utilizing different interfaces to form the multi-hop relay transmission. In addition, the heterogeneity of the terminal itself is shielded through the relay transmission of the interfaces of heterogeneous terminals.

The present embodiment strengthens the communication capacity by improving the multi-interface terminal, complements the advantage of each network through the parallel use of the multiple interfaces, and in addition, realizes the optimal configuration of the resources and the maximum transmission of the information by utilizing the circumjacent multiple terminals to form the advantage of the cooperative transmission. The terminal communication realized through the mode described in the present embodiment can shield the differences of various access technologies of the lower layer, and substantially enables the user terminal to realize a stable and highly efficient information transmission service in any location.

Obviously, it can be understood by those skilled in the art that each module or each step in the above-mentioned embodiment can be implemented by a universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, or they are made into each integrated circuit module respectively, or a plurality of modules or steps therein are made into a single integrated circuit module to be implemented. In this way, the present invention is not limit to any specific form of the combination of the hardware and software.

INDUSTRIAL APPLICABILITY

The embodiment described in the present invention provides a neighbor topology discovery method for a multi-interface terminal, a cooperative communication method and a multi-interface terminal, and improves the utilization rate of the multi-interface. The provided multi-interface terminal shields the heterogeneity of the network and the difference of the interfaces from the users in the communication process; because of taking full advantage of its multiple interfaces, the multi-interface parallel transmission can increase the communication efficiency effectively through the cooperative communication, and expands the terminal reachability and the coverage range of the network effectively by utilizing different interfaces to form the multi-hop relay transmission.

What is claimed is:

1. A method for neighbor topology discovery and cooperative communication of a multi-interface terminal, comprising:

broadcasting, by the multi-interface terminal, a neighbor discovery request message to respective network via each interface after the multi-interface terminal joins a network, the neighbor discovery request message carrying a neighbor hop value; and monitoring, by the multi-interface terminal in the network, broadcast messages of other terminals in the network where each interface of the multi-interface terminal is located;

when detecting the neighbor discovery request message, if the neighbor hop value carried in the detected neighbor discovery request message indicates that the multi-interface terminal is the last hop, then extracting related information in the neighbor discovery request message, and updating neighbor information and network topology information of the multi-interface terminal; and if not, then modifying the neighbor hop value and then forwarding the neighbor discovery request message via all the interfaces, extracting the related information in the neighbor discovery request message, and updating the neighbor information and the network topology information of the multi-interface terminal;

when the multi-interface terminal in the network needs to request for a service, obtaining an available communication link to a target end according to the network topology information;

when the number of the available communication links is more than one, determining a service distributary mode between various available communication links; and requesting, by the multi-interface terminal, for the service and transmitting the service in parallel through each interface corresponding to each available communication link according to the service distributary mode.

2. The method according to claim 1, wherein, the step of broadcasting, by the multi-interface terminal, a neighbor discovery request message to respective network via each interface comprises: broadcasting, by the multi-interface terminal, the neighbor discovery request message to respective network via each interface periodically;

the step of monitoring, by the multi-interface terminal in the network, broadcast messages of other terminals in the network where each interface of the multi-interface terminal is located comprises: monitoring, by the multi-interface terminal in the network, the broadcast messages of other terminals in the network where each interface is located periodically; and wherein, a time period for periodically monitoring the broadcast message is less than a time period for periodically broadcasting the neighbor discovery request message.

3. The method according to claim 1, further comprising: performing, by the multi-interface terminal in the network, statistics on the broadcast message received by each interface; if no broadcast message of other terminal is received in the network where an interface is located within a set time period, then closing, by the multi-interface terminal, the interface or making the interface in a dormant state, and periodically waking up the interface.

4. The method according to claim 1, wherein, the step of determining a service distributary mode between various available communication links comprises:

performing assessment according to one of link information of each available communication link, service information of requested service, and interface information of each interface corresponding to each communication link or a combination thereof, and determining the service distributary mode according to an assessment result.

5. The method according to claim 1, further comprising:

obtaining the available communication link in the following way when the multi-interface terminal in the network needs to request for the service and the available communication link to the target end is not obtained according to the network topology information:

broadcasting, by the multi-interface terminal, a link relay request message carrying the target end to respective network via each interface respectively;

when a neighboring terminal receives the link relay request message, judging whether the target end in the link relay request message is the neighboring terminal; if not, forwarding the link relay request message through all of the neighboring terminal's interfaces; and if yes, returning a link relay response message via an original route to the multi-interface terminal which sends the link relay request message; and after the multi-interface terminal which sends the link relay request message receives the link relay response message, establishing the communication link with the target end.

6. A multi-interface terminal, comprising: a network layer and at least two different interfaces, and further comprising a multi-interface adaptation layer, wherein, the multi-interface adaptation layer comprises a network topology module and an interface management module, wherein, the network topology module is configured to: after the multi-interface terminal joins a network, send a neighbor discovery request message to each interface, wherein, the neighbor discovery request message carries a neighbor hop value; and after receiving the neighbor discovery request message forwarded by the interface, extract related information in the neighbor discovery request message forwarded by the interface and update neighbor information and network topology information;

the interface management module is configured to: control and manage the interfaces; and the interface is configured to: broadcast the neighbor discovery request message to a network where the interface is located after receiving the neighbor discovery request message, and monitor broadcast messages of other terminals in the network where the interface is located; when detecting the neighbor discovery request message, if the neighbor hop value carried in the neighbor discovery request message indicates that the multi-interface terminal is the last hop, then send the neighbor discovery request message to the network topology module; and if not, send the neighbor discovery request message to the network topology module, modify the neighbor hop value in the neighbor discovery request message and then forward the neighbor discovery request message via all the interfaces;

wherein the multi-interface adaptation layer further comprises a cooperative control module;

the cooperative control module is configured to: upon receiving a service request command of the network layer, obtain an available communication link to a target end according to the network topology information maintained by the network topology module;

when the number of the available communication links is more than one, determine a service distributary mode between various available communication links, and send to the interface management module; and the interface management module is further configured to: control each interface corresponding to each available communication link to request for the service and transmit the service in parallel according to the service distributary mode.

7. The multi-interface terminal according to claim 6, wherein, the network topology module is configured to: send a neighbor discovery request command to each interface of the multi-interface terminal periodically;

the interface is configured to: periodically monitor broadcast messages of other terminals in the network where each interface of the multi-interface terminal is located; and wherein, a time period for periodically monitoring the broadcast message is less than a time period for periodically sending the neighbor discovery request message.

8. The multi-interface terminal according to claim 6, wherein, the interface management module is further configured to: perform statistics on the broadcast message received by each interface; if no broadcast message of other terminal is received in the network where an interface is located within a set time period, then close the interface or make the interface in a dormant state, and periodically wake up the interface.

9. The multi-interface terminal according to claim 6, wherein, the cooperative control module is configured to: perform assessment according to one of link information of each available communication link, service information of requested service, and interface information of each interface corresponding to each communication link or a combination thereof, and determine the service distributary mode according to an assessment result.

10. The multi-interface terminal according to claim 6, wherein, the network topology module is further configured to: send a link relay request command carrying the target end to each interface when the service request command of the network layer is received and the available communication link to the target end is not obtained according to the network topology information;

the interface is further configured to: broadcast the link relay request message carrying the target end to respective network respectively after receiving the link relay request command; and forward a link relay response message to the cooperative control module after receiving the link relay response message returned by the target end; and the cooperative control module is further configured to: establish the communication link with the target end after receiving the link relay response message forwarded by the interface.

11. The multi-interface terminal according to claim 6, wherein, the interface is further configured to: upon receiving a link relay request message sent by other terminals, judge whether a target terminal in the link relay request message is the multi-interface terminal; if not, forward the link relay request message to the interface management module; and if yes, send the link relay request message to the network topology module;

the interface management module is further configured to: instruct all interfaces of the multi-interface terminal to forward the link relay request message upon receiving the link relay request message forwarded by the interface; and the network topology module is further configured to: update the network topology information upon receiving the link relay request message, and instruct each interface to return a link relay response message via an original route to a source multi-interface terminal initiating the link relay request.

\* \* \* \* \*